United States Patent [19]

Van Loo et al.

[11] Patent Number: 5,527,575
[45] Date of Patent: Jun. 18, 1996

[54] RECOVERABLE FABRIC SLEEVE

[75] Inventors: Robert H. Van Loo, Heverlee; Jan Vansant, Louvain; Noel Overbergh, Rotselaar; Firmin Ros, Waarschoot, all of Belgium

[73] Assignee: NV Raychem SA, Kessel-Lo, Belgium

[21] Appl. No.: 256,063

[22] PCT Filed: Dec. 18, 1992

[86] PCT No.: PCT/GB92/02351

§ 371 Date: Aug. 16, 1994

§ 102(e) Date: Aug. 16, 1994

[87] PCT Pub. No.: WO93/12921

PCT Pub. Date: Jul. 8, 1993

[30] Foreign Application Priority Data

Dec. 20, 1991 [GB] United Kingdom ............... 9127103

[51] Int. Cl.⁶ .................. B29D 22/00; B29D 23/00; B32B 1/08
[52] U.S. Cl. .................. 428/36.1; 428/257; 428/259; 428/913
[58] Field of Search ............... 428/34.9, 36.1, 428/251, 252, 257, 258, 259, 260, 272, 273, 343, 913

[56] References Cited

U.S. PATENT DOCUMENTS

| | | | |
|---|---|---|---|
| 2,027,962 | 3/1933 | Currie | 19/85 |
| 3,086,242 | 4/1963 | Cook et al. | 19/1 |
| 3,597,372 | 8/1971 | Cook | 260/4 |
| 3,945,493 | 3/1976 | Cardinal | 206/386 |
| 4,626,458 | 12/1986 | Pithouse et al. | 428/36 |
| 4,631,098 | 12/1986 | Pithouse et al. | 156/86 |
| 4,803,103 | 2/1989 | Pithouse et al. | 428/345 |
| 4,816,309 | 3/1989 | Hutt et al. | 428/34.5 |
| 4,820,561 | 4/1989 | Pithouse et al. | 428/34.5 |
| 4,877,660 | 10/1989 | Overbergh et al. | 428/34.9 |
| 4,929,477 | 5/1990 | Will | 428/34.9 |
| 4,952,437 | 8/1990 | Winterhoff et al. | 428/34.9 |
| 5,366,771 | 11/1994 | Beersel et al. | 428/34.9 |

FOREIGN PATENT DOCUMENTS

| | | | |
|---|---|---|---|
| 0137648 | 4/1985 | European Pat. Off. | B29C 61/06 |
| 0278707 | 8/1988 | European Pat. Off. | H02G 15/18 |
| 0115905 | 9/1988 | European Pat. Off. | B29C 67/12 |
| 0116392 | 5/1989 | European Pat. Off. | B26C 61/06 |
| 0117026 | 6/1989 | European Pat. Off. | B29C 67/12 |
| 0116393 | 7/1989 | European Pat. Off. | B29C 61/06 |
| 0243985 | 7/1990 | European Pat. Off. | B29C 61/06 |
| 0158519 | 9/1992 | European Pat. Off. | B29C 61/06 |
| WO91/04844 | 4/1991 | WIPO | B29C 61/06 |

OTHER PUBLICATIONS

International Search Report for PCT/GB92/02351, filed Dec. 18, 1992.
Search Report for British Application No. 9127103.1, filed Dec. 20, 1991.

*Primary Examiner*—Patrick J. Ryan
*Assistant Examiner*—J. M. Gray
*Attorney, Agent, or Firm*—Marguerite E. Gerstner; Herbert G. Burkard

[57] ABSTRACT

A heat recoverable sleeve has a high recovery ratio of at least 60%. It uses a specific arrangement of recoverable fibers in one direction woven in a twill configuration with both heat stable fibers and heat recoverable fibers extending in another direction.

9 Claims, 2 Drawing Sheets

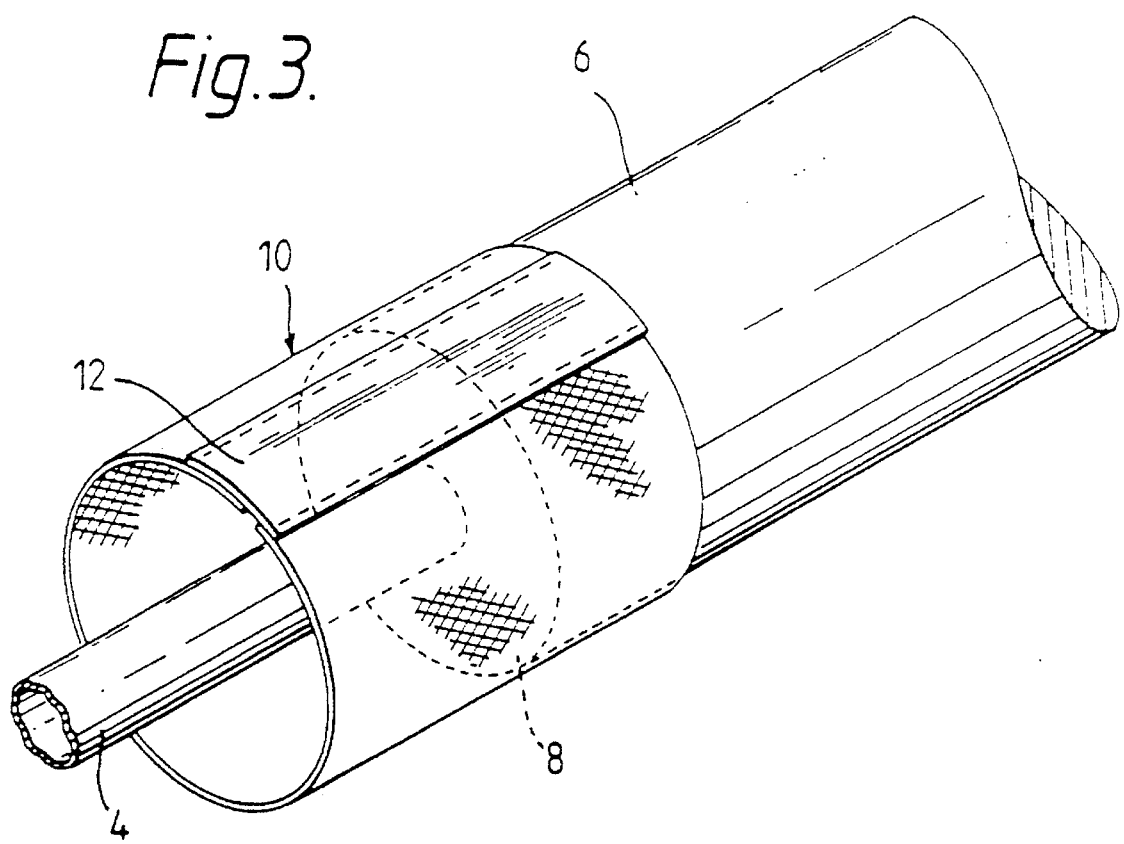
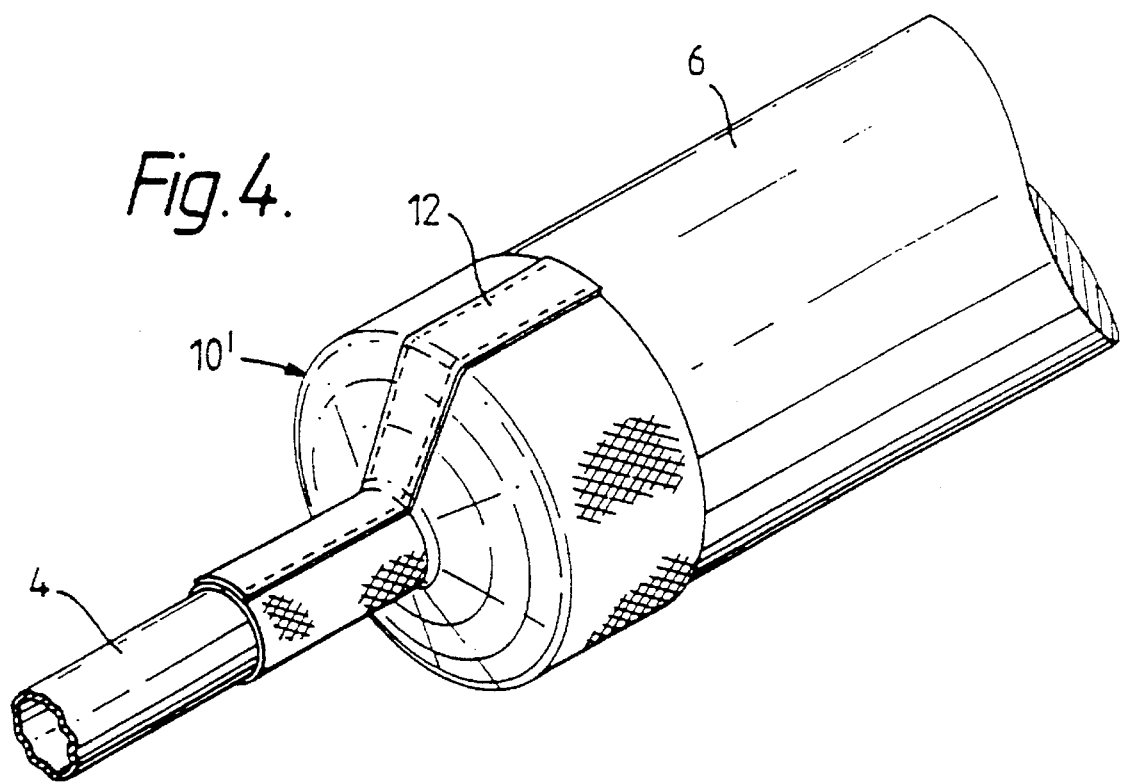

RECOVERABLE FABRIC SLEEVE

BACKGROUND OF THE INVENTION

FIELD OF THE INVENTION

This invention relates to a heat recoverable fabric sleeve for enclosing an elongate object such as a pipe or cable, or a joint between pipes or cables. In particular the invention relates to such a sleeve for covering an object which varies in cross-sectional area along its length.

INTRODUCTION TO THE INVENTION

Heat recoverable articles are well known. They are articles whose dimensional configuration may be made to change when subjected to an appropriate treatment. Typically heat recoverable articles comprise a heat shrinkable sleeve made from a polymeric material that exhibits the property of elastic or plastic memory as described, for example in U.S. Pat. Nos. 2,027,962, 3,086,242 and 3,597,372. More recently heat recoverable articles comprising fabrics have become known, as described for example in EP-A-0116393, EP-A-0117026, EP-B-0115905 and EP-A-0116392. These comprise a recoverable fabric in conjunction with a polymeric matrix formed by laminating a polymeric material to one or both sides of the fabric to render it impervious.

SUMMARY OF THE INVENTION

Recoverable fabrics have found many applications. EP-A-0115905 describes a polymeric-laminated, heat recoverable fabric having a recovery ratio of at least 40%, preferably at least 50 or 60%, that may be used for example to cover substrates with varying or discontinuous contours to provide mechanical protection or protection from the environment. The entire disclosure of EP-B-0115905 is incorporated herein by reference.

Within the scope of the invention described in U.S. Pat. No. 4,624,720 (issued Nov. 25, 1986), the counterpart of European Patent Publication No. 0115905 we have discovered a spedtic heat recoverable fabric configuration that provides a high recovery ratio and particularly advantageous properties.

A first aspect of the invention provides a heat recoverable sleeve having a recovery ratio of at least 60% preferably at least 70%, and comprising:

(a) a woven fabric having 10 to 20 heat recoverable fibers per cm extending in one direction, woven in a twill, preferably a broken twill, configuration with 1 to 10 heat stable fibers per cm in the other weave direction, and 1 to 4 heat recoverable fibers per cm in the said other weave direction, and (b) polymeric material laminated to at least one side of the fabric.

BRIEF DESCRIPTION OF THE DRAWINGS

FIG. 3 is a plan view of a fabric sleeve according to the invention before recovery; and FIG. 4 is a plan view of the sleeve of FIG. 3 after recovery.

DETAILED DESCRIPTION OF THE INVENTION

Figure 1:
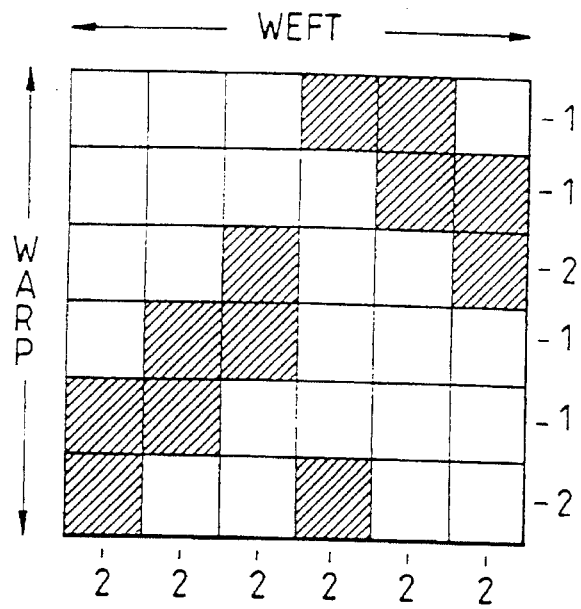
FIGS. 1 and 2 are schematic drawings of a fabric design according to the invention.

The recovery ratio in the present invention is defined in terms of percentages. The ratio represents a change in a dimension as a percentage of the same dimension before recovery. The recovery ratio of the present invention is preferably at least 60%, more preferably at least 70%. Ratios as high as 75% or even 78 or 80% may even be achieved. This large recovery ratio allows the sleeve to be used inter alia in applications where the elongate object exhibits large transitions in cross-sectional area.

The heat recoverable sleeve is preferably heat-shrinkable, preferably radially.

As examples of applications, the sleeve may be used to cover pipes or cables or joints therebetween. Particular applications include (i) end caps for district heating pipes where one end of the sleeve needs to recover onto the outer thick insulation, and the other end needs to recover onto the much smaller diameter steel pipe, (ii) covers for mechanical or flange couplers for pipes, and (iii) covers for bell and spigot joints between pipes. In such applications the maximum cross-sectional dimension of the object to be covered may be as much as 3.5 times, or even 4.5 times the minimum dimension of the object to be covered. A sleeve of the present invention that is initially of uniform cross-sectional size along its length can advantageously be made to shrink around these substrates exhibiting large changes in dimensions along their length.

We have found that the fabric design is an important parameter in achieving a high recovery ratio fabric. In particular we have found a broken twill ⅔ design is the most effective. The configuration of a broken twill ⅔ design is described later with reference to the drawings.

The sleeve may be woven in a closed tubular configuration (i.e., a sleeve of crossed cross-section), but is preferably a wraparound sleeve, longitudinal edges of which can be held together to hold the sleeve in a closed configuration before recovery. As an example, overlapping longitudinal edges of the wrapped sleeve may be fixed to each other by a mechanical joining arrangement that penetrates the fabric, e.g. stitching, stapling or riveting. As another example a patch (which may itself include a fabric which may or may not be the same design as the sleeve, and may or may not be heat recoverable) may be secured to one longitudinal edge of the sleeve. The securement of the patch may be by a mechanical joining arrangement that penetrates that patch and the longitudinal sleeve edge, or by adhesive. Thus, in a preferred embodiment, at least one longitudinal edge of the sleeve is penetrated by a mechanical joining arrangement, preferably stitching, stapling or riveting, which joins that edge (i) to the other longitudinal edge or (ii) to a patch, in order to close the sleeve.

Mechanical penetrating arrangements for joining heat-recoverable fabric sleeves are described in U.S. Pat. No. 4,576,666 (issued Mar. 18, 1896), the counterpart of European Patent Publication No. 0137648, the entire disclosure of which is incorporated herein by reference.

Where one edge of a patch is secured to the sleeve, the patch is preferably adhesive-coated and the adhesive is used to close the wraparound sleeve during installation.

The recoverable fabric may be provided by deforming a fabric woven from dimensional stable fibers. It may also be provided by interlinking (preferably weaving) fibers that are already recoverable. The fibers may be cross-linked and then stretched to render them recoverable. The fibers may, instead, be initially stretched and then cross-linked during the weaving process. Cross-linking may be achieved by irradiation with a beam of high energy electrons, by chemical cross-linking reactions, or using silane-technology.

The formed fabric is laminated on at least one, preferably on at least both sides with a polymeric material which can be a thermoplastic or an elastomer. Suitable examples include ethylene vinyl/acetate copolymers, ethyl acrylate copolymers, polyethylenes including linear low density, low density and high density polyethylene, acrylonitrile butadiene styreric block copolymers, and acrylic elastomers. Other example are mentioned in EP-B-0115905 and EP-A-0116393. Preferably the polymeric material extends throughout the recoverable fabric. Preferably a true composite structure is formed between the recoverable fabric and the polymeric material. This is described in EP-A-0116393.

The laminated fabric may then be subjected to cross-linking. As before the cross-linking may be achieved by irradiation by a beam of high energy electrons, by chemical cross-linking, or using silane technology. The irradiation step cross-links both the recoverable fibers of the fabric and the matrix polymer, and is additional to any initial cross-linking applied to render the fibers heat recoverable.

For a heat recoverable fabric comprising recoverable fibers we can speak of unresolved recovery stress of the fibers and the fabric. This is the stress exertable by the fabric as a whole or by the individual fibers on recovery. This recovery stress can be given, for example, for 100% unresolved recovery (i.e. before any recovery has taken place) or for X% unresolved recovery i.e. where (100–X)% of the recovery available has already taken place). This unresolved recovery stress influences the recovery force of the fibers and the fabric, and also the resistance of the fibers (and hence also the fabric) to splitting on recovery of the sleeve.

We have found that for our fabric sleeve it is desirable for the unresolved recovery stress of the fabric, for 100% unresolved recovery (i.e. where no recovery has taken place) to be in the region of 13N/50 mm to 21N/50 mm (0.185 MPa to 0.3 MPa). The minimum value is important substantially to prevent fiber melting, and also to provide that when the sleeve is recovered into contact with a substrate, there is some remaining residual recovery force. The residual force (i) ensures good contact is maintained with the substrate, even after cooling, and (ii) where the sleeve is coated with adhesive or sealant, urges that adhesive or sealant into sealing contact with the substrate. The maximum value minimizes splitting. Also the unresolved recovery stress exerts hoop forces at the closure region of a wraparound sleeve. Depending on the type of closure used it may be advantageous to minimize the recovery force of the fabric, so that the hoop forces acting on the closure are limited. Therefore, for some applications,. for example, where an adhesive bonded patch is used to close the wraparound sleeve, it is desirable to restrict the recovery force of the fabric to less than 21N/50 mm. This reduces the tendency of the patch to shear relative to the wrapped sleeve.

Similarly the unresolved recovery stress of the fabric at 30% unresolved recovery (i.e. 70% actual recovery) is preferably at least 1N/50 mm (0.0142 MPa) (plus the effect of the weight of the sleeve). This minimum recovery stress is as explained above particularly desirable for a heat shrinkable sleeve lined with an adhesive, or particularly if lined with a sealant such as a mastic, since it provides sufficient force to urge the adhesive or sealant down against the object to be covered. For many applications large masses of sealant are positioned on the object, e.g. around a pipe joint, and this needs to be pushed against by the sleeve in order to form an effective finished sealed joint. This is achieved by the minimum unresolved recovery stress of 1N/50 mm at 30% unresolved recovery, and the minimum recovery stress of 13N/50 mm at 100% unresolved recovery.

Considering the fibers making up the fabric, the unresolved recovery stress of the fibers (at 100% unresolved recovery) is preferably in the range of 0.1N/fiber to 0.2N/fiber (for fibers of 0.4 mm diameter), that is $8 \times 10^{-4}$ N/Tex to $25 \times 10^{-4}$ N/Tex. A Tex is the weight in g per cm.

The fabric design of the present invention is advantageously arranged to achieve the above described unresolved recovery stresses in addition to the high recovery ratio of at least 60% preferably at least 70%, or even as high as 75, 78 or 80%. This therefore allows a combination of recovery over large transitions while exerting relatively low hoop stresses at a closure of a wraparound sleeve. This unique combination is a particular advantage of the fabric design of the present invention.

The fibers may be rendered heat recoverable (e.g. by cross-linking and then deforming the fibers) before or after they are made into a fabric. This initial cross-linking of the fibers step influences the unresolved recovery stress of the fibers referred to above. Also as mentioned above, a second cross-linking step may be carried out after lamination. This influences the behavior of the matrix as well as the sleeve, as is described fully in EP-B-0116393 and EP-B-0115905.

The sleeve comprises 10 to 20 heat recoverable fibers in one direction. This provides the predominant recovery direction of the sleeve, and thus is arranged preferably to extend in the circumferential direction of the sleeve. The predominant recovery direction may constitute either the warp or the weft of the fabric. For some applications, particularly where large diameter sleeves are required, it preferably constitutes the warp, enabling large sleeves to be made on reasonable sized machines. Sleeves up to 150 cm or even 300 cm in diameter can be made in this way.

Preferably the heat recoverable fibers are 0.3–0.5 mm, especially about 0.4 mm in diameter. Preferably the heat recoverable fibers have a Tex (weight in g per cm) of 50 to 200. Each recoverable fiber may comprise, for example, a shrinkable polyethylene fiber. The fibers preferably have a tensile strength of at least 0.1 MPa at their recovery temperature.

The fibers may be monofilaments, multi-filaments, spun staple yarns or yarns produced by fibrillation (e.g. from film). The recovery temperature of the fibers is preferably 100° to 150° C.

The sleeve comprises 1 to 10 heat stable fibers/cm in the other direction, preferably the length direction, of the sleeve. A preferred material for those fibers is glass. Preferably 6 fibers/cm are included e.g. 3 pairs/cm. The heat stable fibers can (i) enhance the burst strength of the sleeve, e.g. in applications where the sleeve is subject to internal pressure and (ii) determine the axial strength of the sleeve.

Preferably the sleeve comprises up to 4, preferably 1 to 2, especially 1.5 heat recoverable fibers per cm in the other direction, preferably the length direction, of the sleeve, in addition to those in the first (preferably radial) direction of the sleeve. The purpose of these is to achieve a smooth surface after recovery.

In one embodiment the fabric according to the invention includes a heating wire for supplying heat to effect recovery. The wire is preferably arranged in a zig zag configuration with the main length of the wires extending along the length of the sleeve. This is described in EP-A-0158519.

The sleeve may be lined with an adhesive or sealant. Instead, or in addition, an inner sealing sleeve which is wholly made of adhesive or sealant, or which is lined with adhesive or sealant may be used.

Figure 2:
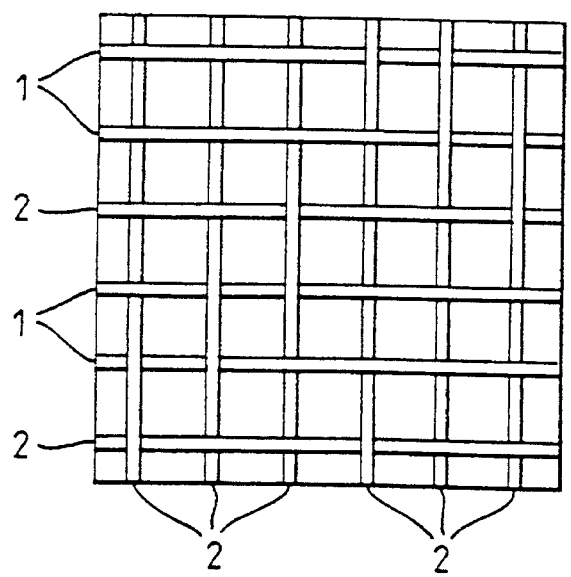

The invention is now described by way of example with reference to the accompanying drawings wherein:

FIGS. 1 and 2 are schematic drawings of a fabric design (broken twill ⅔) according to the invention. FIG. 1 is a block diagram as used in the fabrication industry. The 6 by 6 square block illustrates the passage of 6 adjacent fibers in each of the warp and the weft. In the diagram the weft extends horizontally and the warp vertically. A white square illustrates a fiber passing over the fiber in the other direction. This is also illustrated in the more literal diagram FIG. 2. In FIGS. 1 and 2 the heat-stable or non-recoverable glass fibers are referenced 1 and the heat-shrinkable polyethylene fibers are referenced 2. It will be seen that in the weft (represented by the horizontal rows in FIG. 1) the heat-stable glass fiber passes over four fibers and then under two fibers, while the polyethylene fibers pass over two fibers and then under one. In the warp (the vertical columns) the heat recoverable fibers pass over four fibers and then under two. In each case where four fibers are passed over, the portion of the fibers passed over is staggered in adjacent rows and also in adjacent columns.

FIGS. 3 and 4 shows a fabric sleeve according to the invention positioned around a district heating pipe end before and after recovery. The district heating pipe compresses an inner steel pipe 4 and an outer insulation and covering layer 6 which is cut back at its end to bare the steel pipe. There is a sharp transition 8 at the end of the cut back insulation 6, which needs to be covered. A heat recoverable, wraparound fabric sleeve 10 of broken twill ⅔ design as illustrated in FIGS. 1 and 2 is positioned over the transition. A heat stable patch 12 is stitched to one longitudinal edge of the sleeve 10. The patch is secured to the underlying sleeve to close the wraparound. This securement can be by adhesive or by a mechanical closure. Heat is then applied to recover the sleeve. The recovered edge (now designated 10') is shown in contact with the pipe covering the sharp transition in FIG. 2.

The following example is given to illustrate a wraparound built from preferred materials.

EXAMPLE

The following HDPE monofilament was chosen to provide the recoverable component,

| | |
|---|---|
| $M_n$ = number average molecular weight | 29,400 |
| $M_w$ = weight average molecular weight | 120,800 |
| $M_p$ = peak molecular weight | 57,500 |
| D = $M_w/M_n$ polydispersity | 4.1 |
| Initial Modulus (MPa) | 3881.3 |
| Tensile Strength (MPa) | 534.4 |
| % Elongation (21° C.) | 21 |
| Monofilament-diameter (mm) | 0.38 |

This fiber has the following properties:

| Property | Fiber Properties Radiation Dosage (Mrads) | | | |
|---|---|---|---|---|
| | 0 | 8 | 16 | 32 |
| 100% Modulus (MPa) | | 0.13 | 0.3 | 0.42 |
| Tensile Strength | | 0.93 | 1.4 | 1.46 |
| Elongation to Break (%) | | 1,480 | 924 | 754 |
| Gel Content (%) | | 27.0 | 58.0 | 67.0 |
| Recovery Force (MPa) | | 1.17 | 1.2 | 1.3 |
| Recovery (%) | | 98 | 96 | 95 |

The HDPE fibers were woven with non-recoverable glass fibers to produce the fabric design illustrated in FIG. 1. The recoverable HDPE fibers were the only fibers in the warp. Recoverable HDPE fibers and glass were in the weft.

The glass fibers are preferably ones having the designation EC 9 34 tex×2S152. This type of designation is standard and will be understood by those in the art. Briefly it has the following meaning: EC refers to the tex value of the bundles of filaments, ×2S refers to the number of monofilaments in the bundle, 152 refers to the 152 twists in the bundles per meter.

The warp density was 15 ends/cm, and the weft density was about 4.4 per cm (3 glass bundles and 1.5 HDPE in a 2 glass bundles: 1 HDPE repeating pattern). Hence the warp was the predominant shrink direction.

The fabric was rendered substantially impervious by laminating to it a low density polyethylene at a thickness of 0.5 mm on both sides. Lamination was carried out at such a temperature, pressure and processing speed that the material permeated the interstices of the fabric but no recovery occurred.

The resulting composite was subjected to an irradiation step with 16 MeV electrons in air at room temperature for times sufficient to produce the required recovery ratio.

The resulting composite material had a recovery of at least 70%.

The composite material was used to produce a wraparound sleeve suitable for use for covering a pipe in conjunction with a closure patch.

The sleeve was arranged with the predominant shrink direction around the circumference.

The composite material was coated with a hot-melt adhesive on that side which would be inwardly facing when the sleeve was in the wrapped around configuration. The adhesive used was applied to a thickness of 1.2 mm.

We claim:

1. A heat recoverable sleeve having a recovery ratio of at least 60% and comprising:

(a) a woven fabric having 10 to 20 heat recoverable fibers per cm extending in one direction, woven in a ⅔ broken twill configuration with 1 to 10 heat stable fibers per cm in the other weave direction, and 1 to 4 heat recoverable fibers per cm in the said other weave direction, and (b) polymeric material laminated to at least one side of the fabric.

2. A heat recoverable sleeve according to claim 1, wherein the sleeve is a wraparound sleeve comprising two longitudinal edges.

3. A heat recoverable sleeve according to claim 2, wherein at least one longitudinal edge of the sleeve is penetrated by a mechanical joining arrangement which joins that edge (i) to the other longitudinal edge or (ii) to a patch, in order to close the sleeve.

4. A heat recoverable sleeve according to claim 3, wherein the mechanical joining arrangement is stitching, stapling or riveting.

5. A heat recoverable sleeve according to claim 1, which has an unresolved recovery stress of the fabric at 100% unresolved recovery in the range 13N/50 mm to 21N/50 mm.

6. A heat recoverable sleeve according to claim 1, which has an unresolved recovery stress of the fabric at 30% unresolved recovery of at least 1N/50 mm.

7. A heat recoverable sleeve according to claim 1, wherein the heat recoverable fibers comprise polyethylene.

8. A heat recoverable sleeve according to claim 7, wherein the heat stable fibers comprise glass.

9. A heat recoverable sleeve according to claim 1, wherein the recovery ratio is at least 70%.

* * * * *

UNITED STATES PATENT AND TRADEMARK OFFICE
CERTIFICATE OF CORRECTION

PATENT NO. : 5,527,575
DATED : June 18, 1996
INVENTOR(S) : Van Loo et al.

It is certified that error appears in the above-indentified patent and that said Letters Patent is hereby corrected as shown below:

On The Title Page, Item [75], line 2, replace "Louvain" by --Leuven--.

Column 1, line 16, replace two occurences of "artides" by --articles--.

Column 1, line 39, replace "EP-B-0115905" by --U.S. Patent No. 4,624,720 (issued November 25, 1986), the counterpart of European Patent Publication No. 0115905--.

Column 1, lines 41 to 43, replace "U.S. Patent No. 4,624,720 (issued November 25, 1986), the counterpart of European Patent Publication No. 0115905" by --EP-B-0115905--.

Column 1, line 44, replace "spedtic" by --specific--.

Column 2, line 36, replace "crossed" by --closed--.

Column 3, line 11, replace "styreric" by --styrene--.

Column 3, line 54, replace "applications,." By --applications,--.

Signed and Sealed this

Eighth Day of October, 1996

*Attest:*

BRUCE LEHMAN

*Attesting Officer*      *Commissioner of Patents and Trademarks*